July 17, 1962  J. W. ATTWOOD  3,044,739
PIPE SUPPORTS
Filed Nov. 27, 1959  2 Sheets-Sheet 1
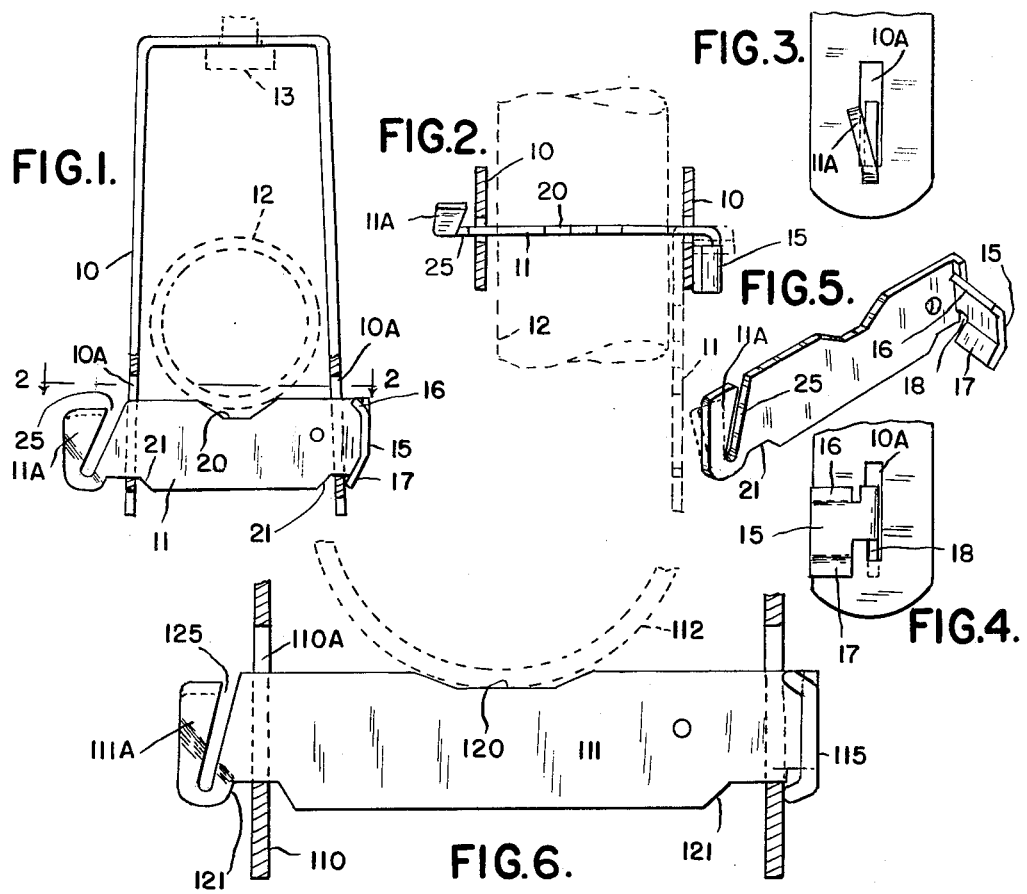
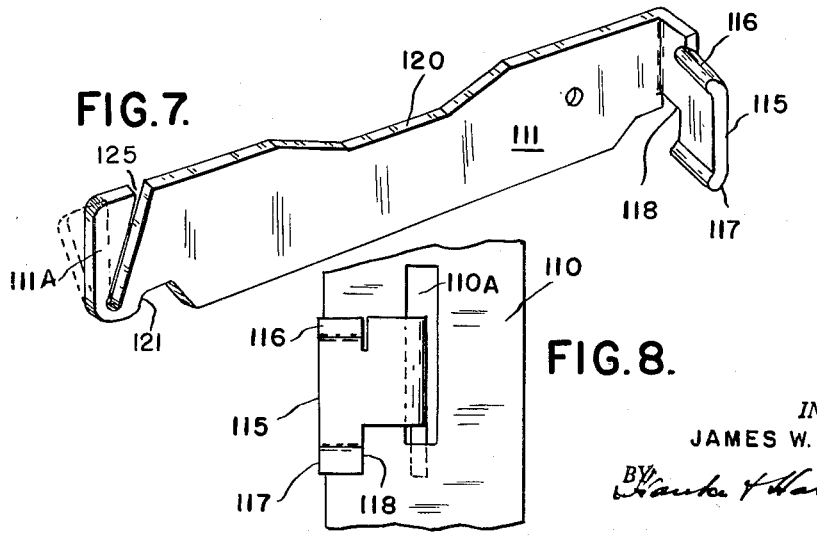
INVENTOR.
JAMES W. ATTWOOD
ATTORNEYS.

INVENTOR.
JAMES W. ATTWOOD
ATTORNEYS

United States Patent Office 3,044,739
Patented July 17, 1962

3,044,739
PIPE SUPPORTS
James W. Attwood, 4118 S. Wayne Road, Wayne, Mich.
Filed Nov. 27, 1959, Ser. No. 855,591
7 Claims. (Cl. 248—58)

The present invention relates to pipe supports or hangers and specifically to supports or hangers adapted to be suspended from ceilings or other overhead structures.

Among the objects of the invention is to provide a hanger which is simpler in construction and use than prior hangers.

Another object is to provide a hanger in which the load supporting element takes the load stress on an edge.

Another object is to provide a hanger that is equal in strength to many forms using a greater amount of metal.

Other objects and advantages will readily appear to those skilled in the art upon reference to the following description and the accompanying drawings in which:

FIG. 1 is a view in elevation with parts in section of a hanger within the invention.

FIG. 2 is a section on line 2—2 of FIG. 1.

FIG. 3 shows in elevation a part of FIG. 1 as if viewed from the left.

FIG. 4 is a similar view from the right of FIG. 1.

FIG. 5 is a view in perspective of the cross member of FIG. 1.

FIG. 6 is a view in elevation of a portion of a slightly different construction.

FIG. 7 is a perspective view of the cross member of FIG. 6.

FIG. 8 is an elevation as from the right of FIG. 6.

FIG. 11 is a top view thereof.

Figure 9:
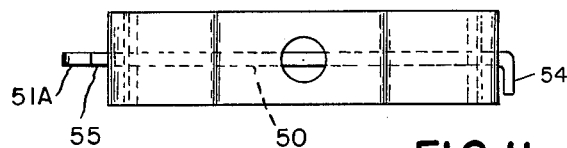
FIG. 9 is a view in elevation of a form of hanger particularly suitable for supporting quite large pipes.

In the drawings, a hanger involving the present invention is shown as consisting of an inverted U-shaped member or yoke 10 and a retainer or blade 11 which extends through the yoke arms and upon which rests the pipe 12. The yoke 10, as in other hangers, is suspended from an overhead support by means of a rod or bolt 13.

The blade 11 and yoke 10 are preferably made of strip metal of suitable width and thickness, depending upon the size of pipe, the yoke 10 being merely bent to form and provided with vertical slots 10A near the ends of the arms. The blade 11, however, is formed at one end, as shown, with a short portion 15 extending at right angles laterally, which portion is severed at the top and bottom so that the upper end of portion 15 may be bent over inwardly of the angle as shown at 16, and lower end of portion 15 also bent over inwardly as indicated at 17. Further, at the angle of bend of portion 15, the metal is cut away at the bottom to provide a notch 18 of sufficient width to receive the metal of the yoke arm for a purpose which will be described.

In its upper edge, blade 11 is provided with a centrally located shallow recess 20 serving to cradle and locate the pipe 12 and in its lower edge are provided the notches 21 serving to locate the blade longitudinally, dropping over the lower walls of the slots 10A.

At the other end of the blade is provided a slot 25 extending from the upper to near the lower edge, preferably at a small angle as shown. Further, the lower closed end of slot 25 is located at such a distance from the side of the adjacent notch 21 that the wall between them is of substantially the same cross sectional area as that of the metal between the closed end of slot 25 and the lower edge of the blade substantially in line with the slot 25.

The effect of this is to provide a relatively long and hence weaker arcuate strip of metal connecting the parts separated by the slot 25, so that the extreme end 11A of retainer 11, separated from the blade body by slot 25, may be easily bent laterally as shown in FIG. 2. When the end 11A is turned, the arcuate strip is subjected to a twist, which makes for easier offsetting of the end 11A when relatively heavy metal is used.

In FIGS. 6, 7 and 8 there is shown a slightly different form of the blade 111, this being used for the larger size of hanger 110 for supporting a larger pipe 112. The blade 111 extends through slots 110A and is provided with notches 121, slots 118 and 125, end 111A, recess 120, and portions 115, 116 and 117, all about similar respectively to the parts 21, 18 and 25, 11A, 20, and 15, 16 and 17 as described for FIGS. 1–5. In this form, the bent over portions 116 and 117 of the part 115 are relatively smaller. Otherwise the two forms are substantially alike and the parts function in about the same fashion.

In the use of the hanger, a suitable number of yokes 10 or 110 are suspended and the pipe elevated between the two arms. The blade 11 or 111 is then passed through the slots 10A and the end 11A or 111A bent laterally a short distance to prevent dislodgement of the blade from the yoke.

As indicated in FIG. 2, the blade may be turned into the plane of the yoke arm 10 and the notch 18, dropping over the bottom of the slot 10A, and it will remain in this position while the pipe 12 is being entered. It will then of course be lifted and swung around for insertion in the other slot. The bent over parts of portion 15 prevent passage of this end of the blade through the slot.

Figure 10:
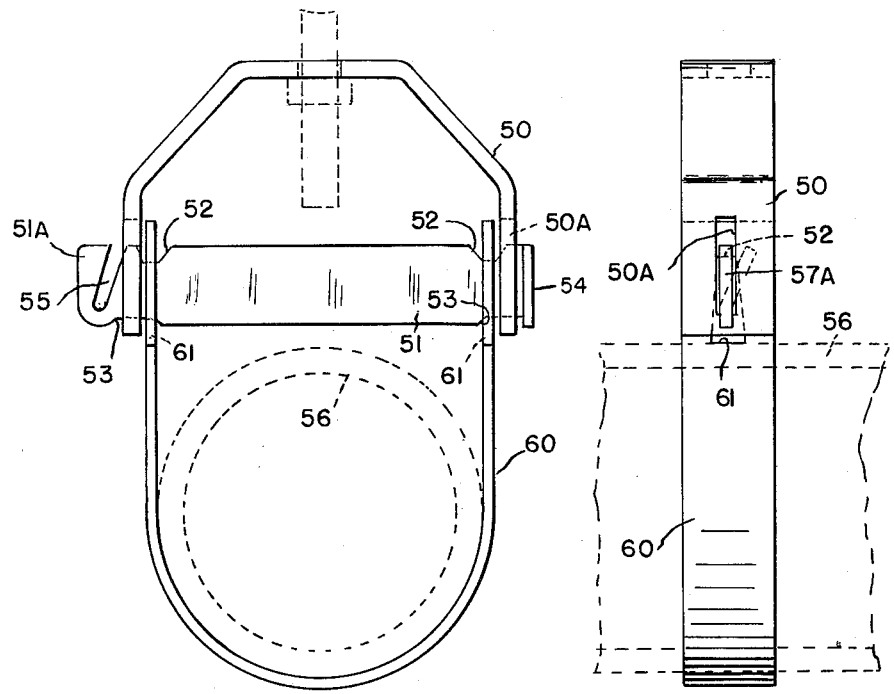
FIG. 10 is a side elevation of the same.

In FIGS. 9 to 11, a yoke 50 is indicated as similar to but somewhat shorter than yoke 10. It is provided near the ends of the arms with vertical slots 50A through which extends the blade 51 which is similar to blade 11 except that it does not have the recess 20 at its mid portion but has instead notches 52 near the ends of the upper edge. In its lower edge it is provided with notches 53 adjacent the ends, and like blade 11, it has one end 54 bent at right angles and the other end provided with an angularly arranged slot 55.

In this form, the pipe 56 does not rest upon the blade as in FIGS. 1 to 8, but in a U-shaped loop 60 which is suspended from the blade 51 and is provided with slots 61 registering with slots 50A and traversed by blade 51. Slots 61 are preferably somewhat wider at the bottom as shown in FIG. 10 so as to allow the loop 60 to swing a short distance with the expansion and contraction of the pipe.

As will be noted from FIG. 9, the notches 52 are so located that, when the yoke and loop are traversed by the blade, the loop arm and the yoke arm are substantially close together so that the metal of the blade 51 is not subjected to a bending stress but to shearing stress.

As in the case of blades 11 and 111, the blade 51 is retained in position by bending laterally the end 51A.

I claim:

1. A pipe hanger comprising a U-shaped yoke adapted to be suspended in inverted position and provided with narrow vertical slots near the ends of the yoke arms, and a pipe supporting blade passing through said slots, said blade having at one end a portion bent at an angle and having the upper and lower edges of said bent portion also bent over, and having closely adjacent its other end a slot extending from the upper edge of the blade to adjacent the lower edge.

2. A pipe hanger comprising a U-shaped yoke adapted to be suspended in inverted position and provided with narrow vertical slots near the ends of the yoke arms, and a pipe supporting blade passing through said slots, said blade having at one end a portion bent at an angle and having the upper and lower edges of said bent portion also bent over, a shallow notch being provided in the lower portion of said bent portion, and said blade having closely adjacent its other end a slot extending from the upper edge of the blade to adjacent the lower edge.

3. A pipe hanger comprising an inverted U-shaped yoke having slots and a blade passing through said slots, said blade including means preventing passage of said blade through said slots, notches in the bottom of said blade cooperating with the lower walls of the slots to position said blade longitudinally, said blade adjacent its other end having a slot extending from the upper edge to near the lower edge, the bottom of said slot being below the upper edge of the adjacent longitudinally positioning notch and closely adjacent the side wall of the notch whereby a readily bendable and relatively thin strip remains between the bottom of said slot and the side of said adjacent notch.

4. A hanger assembly comprising a support having a pair of spaced depending arms each having a slot, and a supporting blade extending between said arms and through said slots, one end of said blade being bent substantially normal to the plane of said blade, and the other end of said blade having an upper and a lower edge and a slot extending from one edge to closely adjacent the other edge, said slot forming a readily distortable portion substantially separated from the rest of the blade, whereby said end portion may be readily bent out of the plane of said blade thereby coacting with said end bent substantially normal to the plane of said blade to retain said blade in said slots.

5. The assembly as defined in claim 4 and in which said slot is inclined from its bottom inwardly toward the adjacent arm.

6. The assembly as defined in claim 4 and in which said first mentioned bent end of said blade has a slot in the lower edge thereof arranged to seat over the bottom edge of the slot in the adjacent arm only when said second mentioned end of the blade is removed from its slot and the blade has been rotated about 90 degrees from a plane common to the slots of said arms.

7. A hanger assembly comprising a support having a pair of spaced depending arms each having a slot, and a substantially flat supporting blade extending between said arms and through said slots, one end of said blade being formed to prevent its passage through said slots, the other end of said blade having an upper and lower edge and a slot extending from one edge to closely adjacent the other edge to substantially separate an end portion from the rest of the blade, and a readily distortable strip portion adjacent an end of said blade slot whereby said end portion is readily twisted out of the plane of the rest of said blade.

References Cited in the file of this patent

UNITED STATES PATENTS

| | | |
|---|---|---|
| 324,929 | Finnegan | Aug. 25, 1885 |
| 919,558 | Doran | Apr. 27, 1909 |
| 945,212 | Blackburn | Jan. 4, 1910 |
| 1,285,023 | Burnett | Nov. 19, 1918 |
| 1,893,467 | Merwin | Jan. 3, 1933 |
| 2,616,643 | Budd | Nov. 4, 1952 |
| 2,714,497 | Denis | Aug. 2, 1955 |
| 2,914,354 | Moberg | Nov. 24, 1959 |

FOREIGN PATENTS

| | | |
|---|---|---|
| 15,005 | Great Britain | June 27, 1912 |